(12) United States Patent
Lee et al.

(10) Patent No.: US 7,997,137 B2
(45) Date of Patent: Aug. 16, 2011

(54) BIDIRECTIONAL READOUT CIRCUIT FOR DETECTING DIRECTION AND AMPLITUDE OF CAPACITIVE MEMS ACCELEROMETERS

(75) Inventors: Sung Sik Lee, Milyang (KR); Ji Man Park, Daejeon (KR); Myung Lae Lee, Daejeon (KR); Sung Hae Jung, Daejeon (KR); Chang Han Je, Daejeon (KR); Gunn Hwang, Seoul (KR); Chang Auck Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 631 days.

(21) Appl. No.: 12/168,025

(22) Filed: Jul. 3, 2008

(65) Prior Publication Data

US 2009/0056448 A1 Mar. 5, 2009

(30) Foreign Application Priority Data

Aug. 29, 2007 (KR) .................. 10-2007-0087261

(51) Int. Cl.
*G01P 15/08* (2006.01)
(52) U.S. Cl. ............... 73/514.32; 324/678; 702/141
(58) Field of Classification Search ............ 73/514.32; 324/678; 702/141
See application file for complete search history.

(56) References Cited

U.S. PATENT DOCUMENTS

| 4,065,715 | A | * | 12/1977 | Jaffe et al. ............ 324/678 |
| 4,642,555 | A | * | 2/1987 | Swartz et al. .......... 324/677 |
| 5,495,414 | A | | 2/1996 | Spangler et al. |
| 5,646,346 | A | * | 7/1997 | Okada .............. 73/504.04 |
| 2004/0158439 | A1 | | 8/2004 | Kim et al. |

FOREIGN PATENT DOCUMENTS

KR 10-2004-0050399 A 6/2004

OTHER PUBLICATIONS

Zeljko Ignjatovic, et al. "*An Interface Circuit for Measuring Capacitance Changes Based Upon Capacitance-to-Duty Cycle (CDC) Converter*" IEEE Sensors Journal, 2005.

* cited by examiner

*Primary Examiner* — John E Chapman

(57) ABSTRACT

There is provided a bidirectional readout circuit for detecting direction and amplitude of an oscillation sensed at a capacitive microelectromechanical system (MEMS) accelerometer, the bidirectional readout circuit converting capacitance changes of the capacitive MEMS accelerometer into a time change amount by using high resolution capacitance-to-time conversion technology and outputting the time change amount as the direction and the amplitude of the oscillation by using time-to-digital conversion (TDC) technology, thereby detecting not only the amplitude of the oscillation but also the direction thereof, which is capable of being applied to various MEMS sensors.

8 Claims, 5 Drawing Sheets

BIDIRECTIONAL READOUT CIRCUIT FOR DETECTING DIRECTION AND AMPLITUDE OF CAPACITIVE MEMS ACCELEROMETERS

CROSS-REFERENCE TO RELATED APPLICATIONS

This application claims the priority of Korean Patent Application No. 10-2007-0087261 filed on Aug. 29, 2007, in the Korean Intellectual Property Office, the disclosure of which is incorporated herein by reference.

BACKGROUND OF THE INVENTION

1. Field of the Invention

The present invention relates to a circuit for detecting direction and amplitude of oscillations of a capacitive microelectromechanical system (MEMS) accelerometer, and more particularly, to a bidirectional readout circuit for detecting direction and amplitude of an oscillation by using an enable signal having a time change amount generated by capacitance-to-time converting capacitive changes of an MEMS accelerometer.

The work related to the present invention was supported by the IT R&D program of MIC/IITA [2006-S-054-02, Title: Development of CMOS based MEMS processed multi-functional sensor for ubiquitous environment]

2. Description of the Related Art

Microelectromechanical systems (MEMS) technology indicates a micro two-dimensional structure having a sensor or actuator function and a system including the same, in which micro mechanical devices, difficult to be distinguished with naked eyes, such as a sensor built-in a semiconductor chip and an actuator, are coupled with a circuit.

The MEMS technology provides core technology to Ubiquitous sensor network fields such as digital information detection, mass storage, micro displays, micro energy source, and wireless or wired communication. The MEMS technology is applied to components of various information devices such as magnetic and optical heads and utilized as accelerometers in automotive airbags.

Accordingly, researches on Readout Integrated Circuits (ROIC) for processing signals of sensors using the MEMS technology (hereinafter, referred to as MEMS sensors) are actively performed.

MEMS sensors may be largely divided into vector quantity sensors and scalar quantity sensors. The scalar sensors have no direction, such as sensors for temperature or humidity.

As representative vector quantity sensors, there are accelerometers. Capacitive MEMS accelerometers sense and convert displacement, velocity or acceleration, externally applied, into electric signals, which are manufactured using the MEMS technology and semiconductor integrated circuit processing technology. As representative capacitive MEMS accelerometers, there are accelerometers in automotive airbags.

As representative detection circuits used for ROIC of MEMS accelerometers, there are capacitance-to-time converters and time-to-digital converters (TDC), which are advantageous to high resolution. Such detection circuits are generally used for scalar quantity sensors since it is difficult to determine direction of a scalar quantity, such as time.

SUMMARY OF THE INVENTION

As described above, there is a difficulty in determining the direction of the scalar quantity such as time, which makes it impossible to be applied to accelerometers that are vector quantity sensors.

Accordingly, an aspect of the present invention provides a high resolution direction detection circuit capable of detecting not only amplitude of an oscillation, which is a vector quantity, but also direction (direction) by using a capacitance-to-time converter advantageous to high resolution.

According to an aspect of the present invention, there is provided a bidirectional readout circuit for detecting direction and amplitude of oscillations of a capacitive microelectromechanical system (MEMS) accelerometer, the bidirectional readout circuit including: a capacitance-to-time conversion unit generating an enable signal having a time change amount corresponding to a capacitance change amount of a capacitive MEMS accelerometer that changes capacitance by capacitance-to-time converting according to external oscillation; an oscillation detection unit detecting direction and amplitude of an oscillation by using the enable signal; and an output unit outputting the detected direction and amplitude of the oscillation as digital values.

The capacitive MEMS accelerometer may use one of a single input type and a differential input type.

The capacitance-to-time conversion unit may include: a first capacitance comparator comparing a first voltage corresponding to a first capacitance varying with an external oscillation with a reference voltage and outputting a first square wave having a time width corresponding to the first capacitance; a second capacitance comparator comparing a second voltage corresponding to a second capacitance that is a reference, with the reference voltage and outputting a second square wave having a time width corresponding to the second capacitance; and an XOR operator performing XOR on the first and second square waves and outputting an enable signal having a time change amount corresponding to a time difference between points in time when the first and second square waves starts, respectively.

The oscillation detection unit may include: an oscillation direction detector comparing the enable signal with one of the first square wave and the second square wave and detecting the direction of the oscillation; and an oscillation amplitude detector detecting the amplitude of the oscillation by a value of counting for an amount of time corresponding to the enable signal.

The oscillation direction detector may include a one-bit latch receiving one of the first square wave and the second square wave, and the enable signal and storing the one of the first square wave and the second square wave for a time corresponding to the enable signal.

The oscillation direction detector may detect the direction as "1" when the first square wave outputted from the first capacitance comparator is high, identical to the enable signal, and detect the direction as "0" when the first square wave is low, different from the enable signal.

The oscillation amplitude detector may include: an n-bit counter counting the second square wave outputted from the second capacitance comparator for a time corresponding to the enable signal; and an n-bit latch storing a value of the counted n bits.

The output unit may output the direction stored in the one-bit latch as a most significant bit, receive the value of the n bits, stored in the n-bit latch, and output the received value as an n+1-bit digital value.

The bidirectional readout circuit for detecting the direction and the amplitude of the oscillation of the capacitive MEMS accelerometer may detect not only the amplitude of the oscillation, which is a vector quantity, but also the direction of the oscillation by employing a direction detection circuit using capacitance-to-time conversion, which has high resolution characteristics.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
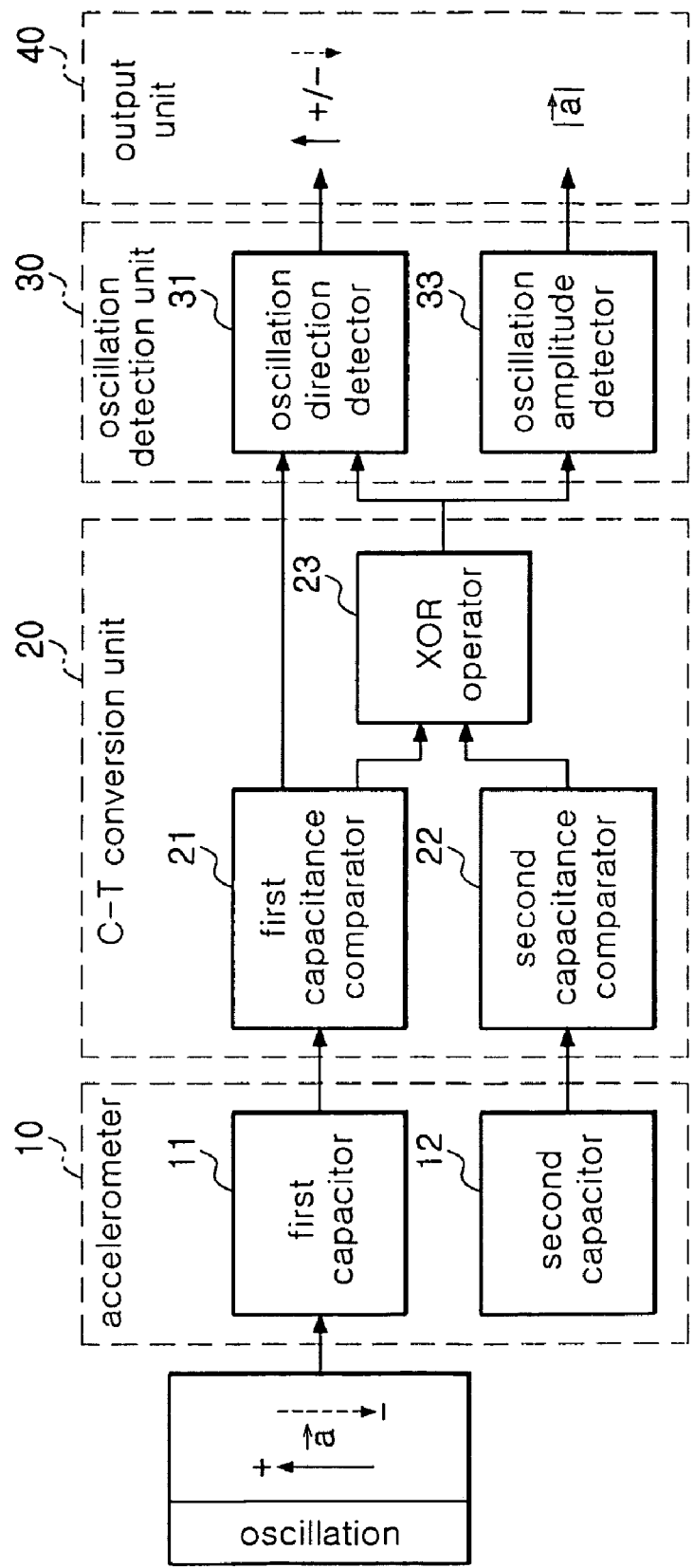
FIG. 1 is a concept diagram illustrating a bidirectional readout circuit for detecting direction and amplitude of an oscillation of a capacitive microelectromechanical system (MEMS) accelerometer, according to an exemplary embodiment of the present invention.

Exemplary embodiments of the present invention will now be described in detail with reference to the accompanying drawings.

Only, in describing operations of the exemplary embodiments in detail, when it is considered that a detailed description on related well-known functions or constitutions may make essential points of the present invention be unclear, the detailed description will be omitted.

Also, in the drawings, the same reference numerals are used throughout to designate the same or similar components.

FIG. 1 is a concept diagram illustrating a bidirectional readout circuit for detecting direction and amplitude of an oscillation of a capacitive microelectromechanical system (MEMS) accelerometer, according to an exemplary embodiment of the present invention. Readout integrated circuits (ROICs), basically, have a capacitance-to-time (C-T) conversion block and a time-to-digital conversion (TDC) block.

The bidirectional readout circuit includes a C-T converter 20, an oscillation detection unit 30, and an output unit 40.

An accelerometer 10 is a capacitive microelectromechanical system (MEMS) accelerometer and includes a first capacitor 11 changing a first capacitance and a second capacitor 12 changing a second capacitance.

Also, the accelerometer 10 has different capacitances according to a gap of two capacitors varied due to an external oscillation or tilting.

Accordingly, direction and amplitude of an oscillation are detected using a difference in the capacitances different according to the gap of the two capacitors.

Also, the present embodiment may use not only a differential input type using two capacitors but also a single input type using one capacitor.

For example, in the case of the single input type, an accelerometer having one capacitor is used and a reference capacitance of a comparator is set as 20 pF. When the capacitance of the accelerometer is smaller than 20 pF, an amplitude bit and a sign bit are outputted as "0". When the capacitance of the accelerator is greater than 20 pF, an amplitude bit and a sign bit are outputted as "1". Since basic operation is identical to that of the differential input type, detailed description thereof will be omitted.

The C-T converter 20 generates an enable signal having a time change amount corresponding to a changed capacitance of the accelerometer 10. That is, capacitances changed at the two capacitors of the accelerometer 10 are shown as a time change amount via C-T conversion. The time change amount is used to detect direction and amplitude of an oscillation at the oscillation detection unit 30, as the enable signal.

In detail, when there is no difference between the capacitances of the two capacitors, a point in time of outputting a first voltage charged and increased according to the capacitance of the first capacitor 11 as a first square wave is identical to a point in time of outputting a second voltage charged and increased according to the capacitance of the second capacitor 12 as a second square wave. When there is present a difference of the capacitances due to an oscillation, a start point in time when the first square wave is outputted is different from a start point in time when the second square wave is outputted.

That is, a time difference between the start points in time of outputting the first and second square waves is in direct proportion to the difference between a first capacitance and a second capacitance. Accordingly, direction of the oscillation is detected using the time difference and capacitance changes corresponding to amplitude of the oscillation are detected using a length of the time difference.

The oscillation detection unit 30 includes an oscillation direction detector 31 including a one-bit latch as a TDC block and detecting direction of an oscillation by using a time difference between start points in time of outputting two square waves and an oscillation amplitude detector 33 including an n-bit counter and an n-bit latch and detecting amplitude of the oscillation by using a time change amount corresponding to the time difference between the start points in time of outputting the two square waves.

The C-T conversion technology and the TDC technology detecting amplitude of an oscillation as a digital value are generally used in scalar quantity sensors. Accordingly, a detailed description thereof will be omitted.

The output unit 40 receives one bit indicating direction of an oscillation from the oscillation direction detector 31 and n bits indicating amplitude of the oscillation from the oscillation amplitude detector 33 and outputs a digital value of n+1 bits. The bit indicating the direction of the oscillation is located on a most significant bit of the digital value of n+1 bits.

Figure 2:
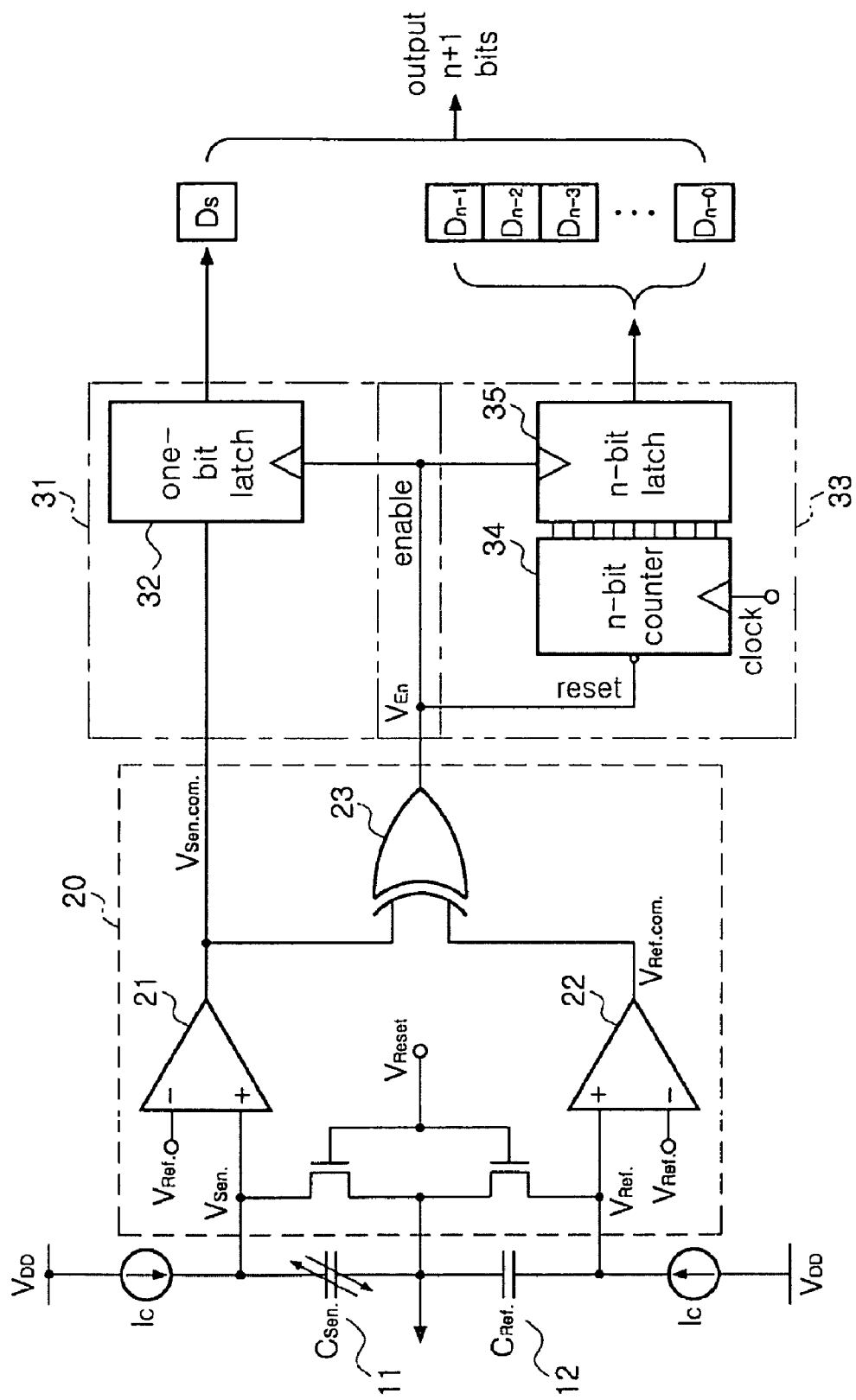
FIG. 2 is a detailed circuit diagram illustrating the bidirectional readout circuit of FIG. 1.

FIG. 2 is a circuit diagram illustrating the bidirectional readout circuit of FIG. 1.

Referring to FIG. 2, the accelerometer 10 includes the first capacitor 11 and the second capacitor 12, one or more of which vary a capacitance thereof due to an external oscillation and tilting.

The C-T conversion unit 20 includes a first capacitance comparator 21 comparing a first voltage corresponding to a first capacitance with a reference voltage Vref and outputting a first square wave having a time width corresponding to the first capacitance, a second capacitance comparator 22 comparing a second voltage corresponding to a second capacitance with the reference voltage Vref and outputting a second square wave corresponding to the second capacitance, an XOR operator 23 receiving the first square wave and the second square wave and outputting an enable signal VEn having a time change amount corresponding to a time difference between points in time of starting the first square wave and the second square wave.

The oscillation direction detector 31 includes a one-bit latch 32 receiving and storing the first square wave outputted from the first capacitance comparator 21 and the enable signal VEn that is an output signal of the XOR operator 23.

The oscillation amplitude detector 33 includes an n-bit counter 34 receiving the enable signal VEn that is the output signal of the XOR operator 23 as a reset signal and outputting amplitude of an oscillation as a value obtained by counting a time length corresponding to the enable signal VEn and an n-bit latch 35 receiving and storing the enable signal VEn and an output of the n-bit counter 34 for an amount of time corresponding to the enable signal VEn.

Operation of the C-T conversion unit 20 and oscillation direction detection performed at the oscillation direction detector 31 will be described in detail.

FIG. 3 is timing diagrams illustrating C-T conversion operation of the C-T conversion unit 20.

Figure 3A:
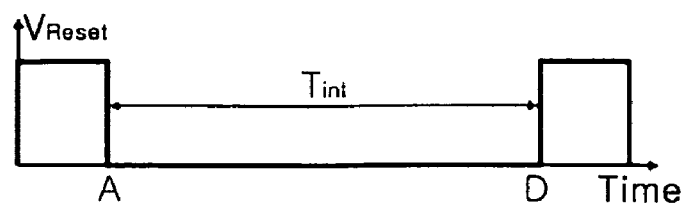
FIG. 3 is timing diagrams illustrating capacitance-to-time conversion performed at a capacitance-time converter according to an exemplary embodiment of the present invention.

As shown in FIG. 3A, when a reset voltage VReset is high while the reset voltage VReset is applied, a first voltage Vsen and a second voltage VRef are 0.

On the other hand, when the reset voltage VReset becomes low, the first voltage VSen of the first capacitor 11 is increases at a point in time A where "low" starts. When the first voltage VSen is more than the reference voltage Vref of the first capacitance comparator 21, the first capacitance comparator 21 outputs a square wave as shown in FIG. 3B, which is called as a first square VSen.Com.

At the same time, the second voltage VRef of the second capacitor 12 increases from the point in time A where the reset voltage VReset becomes low. When the second voltage VRef is more than the reference voltage Vref of the second capacitance comparator 22, the second capacitance comparator 22 outputs a square wave as shown in FIG. 3C, which is called as a second square wave VRef.Com.

Accordingly, points in time of charging the first and second capacitors 11 and 12 are identical to each other as the point in time A but start points in time of the first and second square waves VSen.Com. and VRef.Com. are different from each other as B and C due to a difference of the capacitances of the first and second capacitors 11 and 12, which vary with an oscillation state.

Figure 3B:
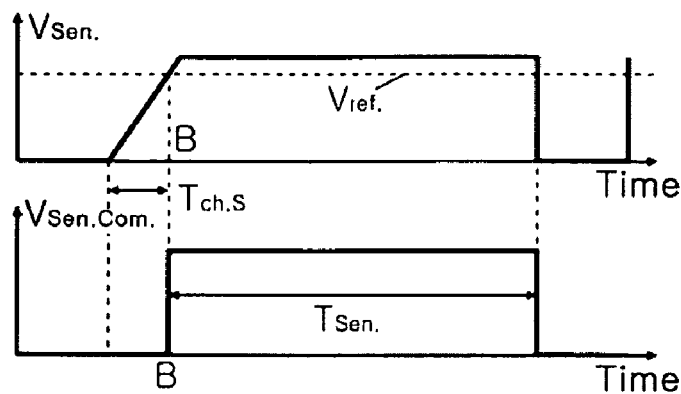
Figure 3C:
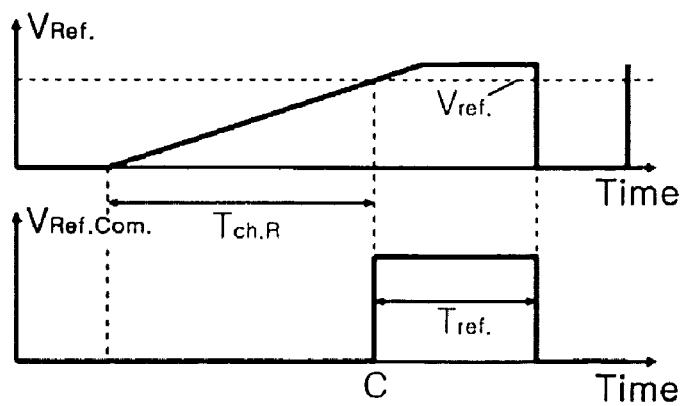

That is, the start points of the first and second square waves VSen.Com. and VRef.Com. are identical to each other when there is no difference between the capacitances of the first and second capacitors 11 and 12 and are different from each other as B and C when there is a difference between the capacitances of the first and second capacitors 11 and 12 due to an oscillation, as shown in FIG. 3B and FIG. 3c.

The XOR operator 23 performs exclusive OR on the first square wave VSen.Com. and the second square wave VRef.Com. and outputs a count flag.

Figure 3D:
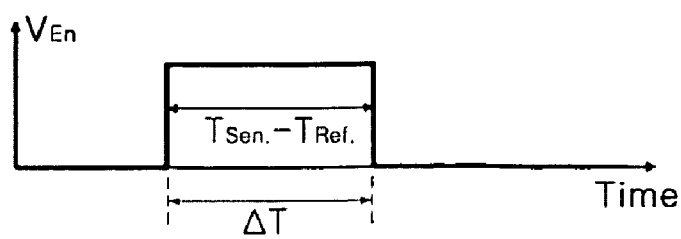

The count flag is a square wave having a time width corresponding to a difference $\Delta T = T_{Sen} - T_{Ref}$ between the start points of the first square wave VSen.Com. and the second square wave VRef.Com., which is an enable signal VEn, as shown in FIG. 3D.

A time width of the enable signal VEn is in direct proportion to a difference between the first capacitance and the second capacitance. Accordingly, capacitance changes corresponding to amplitude of an oscillation may be detected via a length of the enable signal VEn.

A capacitance-to-time conversion relationship is as shown in Equation 1.

$$|T_{Sen} - T_{Ref}| = |T_{ch\cdot S} - T_{ch\cdot R}| \approx 0.5 \cdot \frac{|C_{Sen} - C_{Ref}| \cdot V_{ref}}{I_C} \quad \text{Equation 1}$$

That is, since a reference voltage Vref and IC are fixed values, $\Delta T \approx \Delta C$.

FIG. 4 is timing diagrams illustrating oscillation direction detection performed at the oscillation direction detector 31 including the one-bit latch 32. The one-bit latch 32 uses the first square wave VSen.Com. and the enable signal VEn outputted from the first capacitance comparator 21.

The one-bit latch 32 receives the first square wave VSen.Com. outputted from the first capacitance comparator 21 and stores the received first square wave VSen.Com. for a time corresponding to the enable signal VEn.

The enable signal VEn is compared with the first square wave VSen.Com. When the first capacitance of the first capacitor 11 is greater than the second capacitance of the second capacitor 12, while the first square wave VSen.Com. and the enable signal are high as shown in FIG. 4A, the direction is outputted as "1".

Figure 4A:
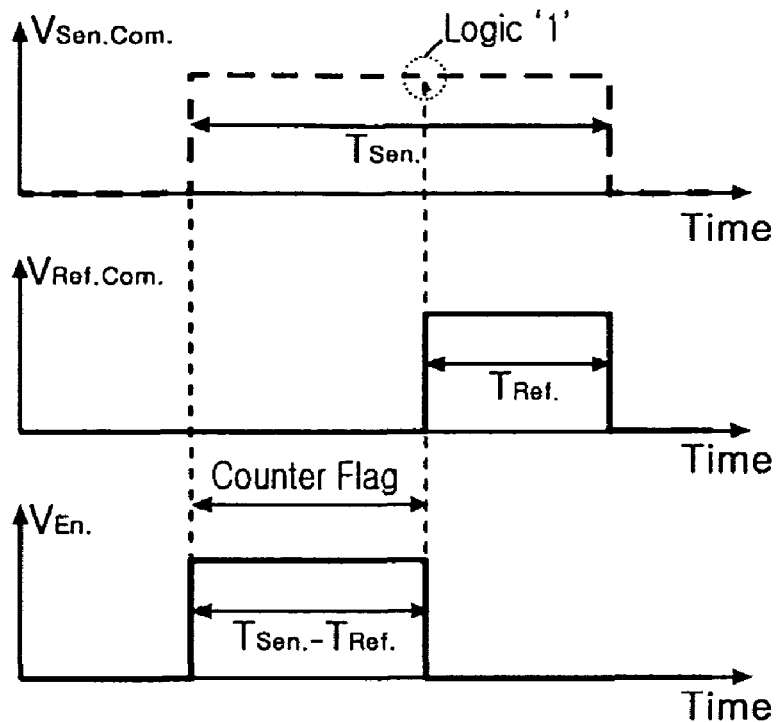
FIG. 4 is timing diagrams illustrating an operation of detecting the direction of the oscillation, performed at an oscillation direction detector including one-bit latch.
Figure 4B:
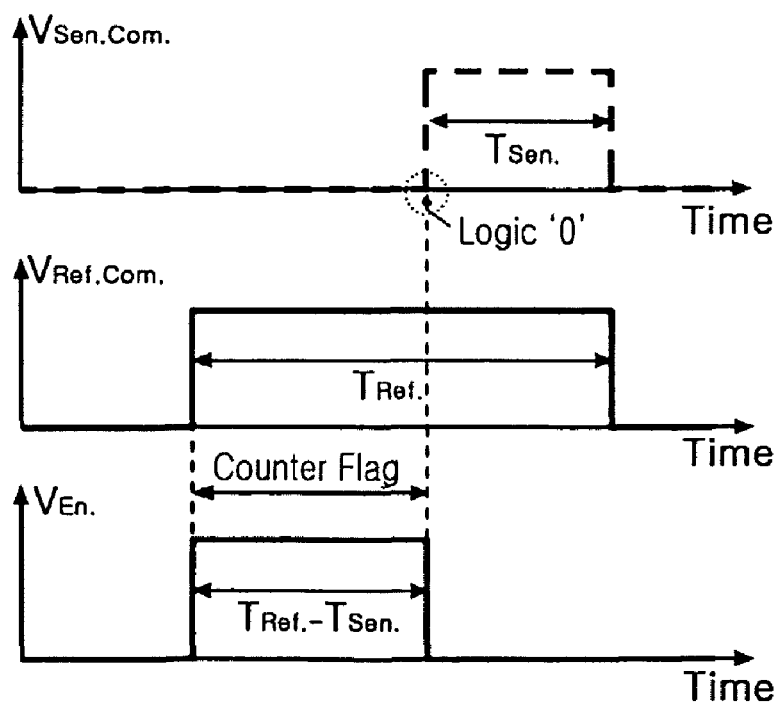

On the other hand, as shown in FIG. 4B, when the first capacitance of the first capacitor 11 is smaller than the second capacitance of the second capacitor 12, while the first square wave VSen.Com. is opposite to the enable signal VEn, that is, the enable signal VEn is high while the first square wave VSen.Com. is low, the direction is outputted as "0".

Accordingly, the enable signals VEn of FIG. 4A and FIG. 4B are identical to each other as shown in $|T_{Sen} - T_{Ref}| = |T_{Ref} - T_{Sen}|$, the directions thereof are opposite to each other.

In this case, comparing the first square wave VSen.Com. outputted from the first capacitance comparator 21 with the enable signal VEn in the case of oscillations having opposite directions is identical to comparing the first capacitance of the first capacitor 11 with the second capacitance of the second capacitor 12 to check whether the first capacitance is greater than the second capacitance.

That is, when the first capacitance is smaller than the second capacitance, a direction bit is outputted as "0". When the first capacitance is greater than the second capacitance, a direction is outputted as one bit of "1".

The direction bit is shown together with a digital value corresponding to the amplitude and it is determined whether a most significant bit of a final value is 0 or 1, thereby detecting the direction of the oscillation.

FIG. 5 is diagrams illustrating waveforms outputting direction and amplitude of an oscillation by driving bidirectional readout circuit.

Figure 5A:
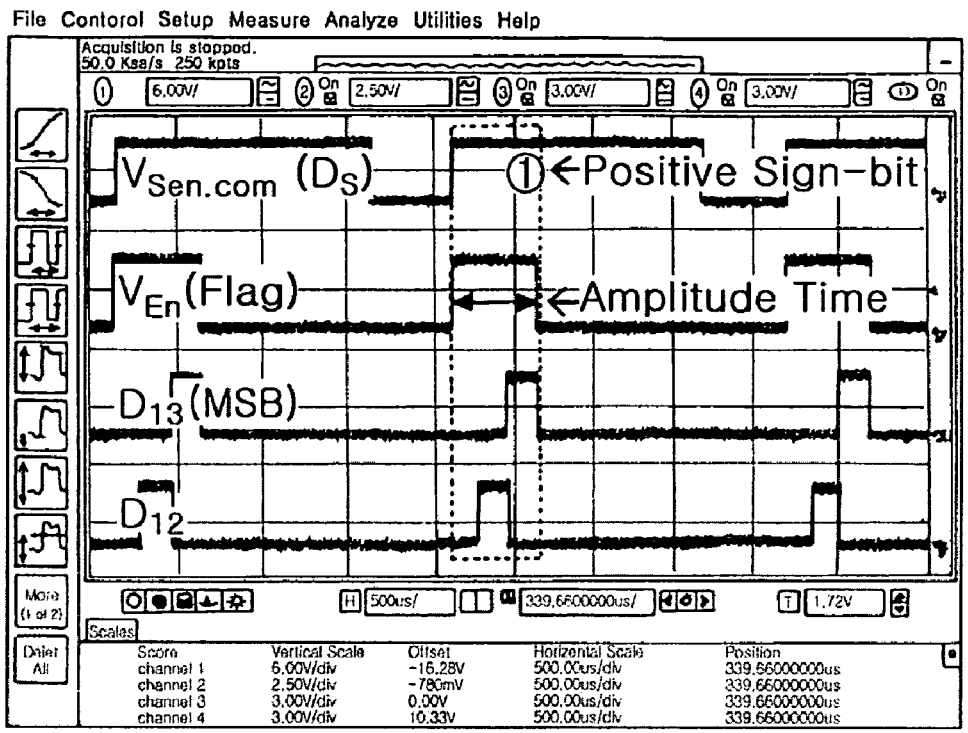
FIG. 5 illustrates real output waveforms outputting the direction and the amplitude of the oscillation by driving the bidirectional readout circuit of FIG. 1.

Referring to FIG. 5A, a first square wave VSen.Com. and a enable signal VEn are high, the direction is "1" and the amplitude is (D13, D12)=(1, 0). Also, referring to FIG. 5B, since the first square wave VSen.Com. is low and the enable signal VEn is high, the direction is "0" and the amplitude is (D13, D12)=(1, 0).

Figure 5B:
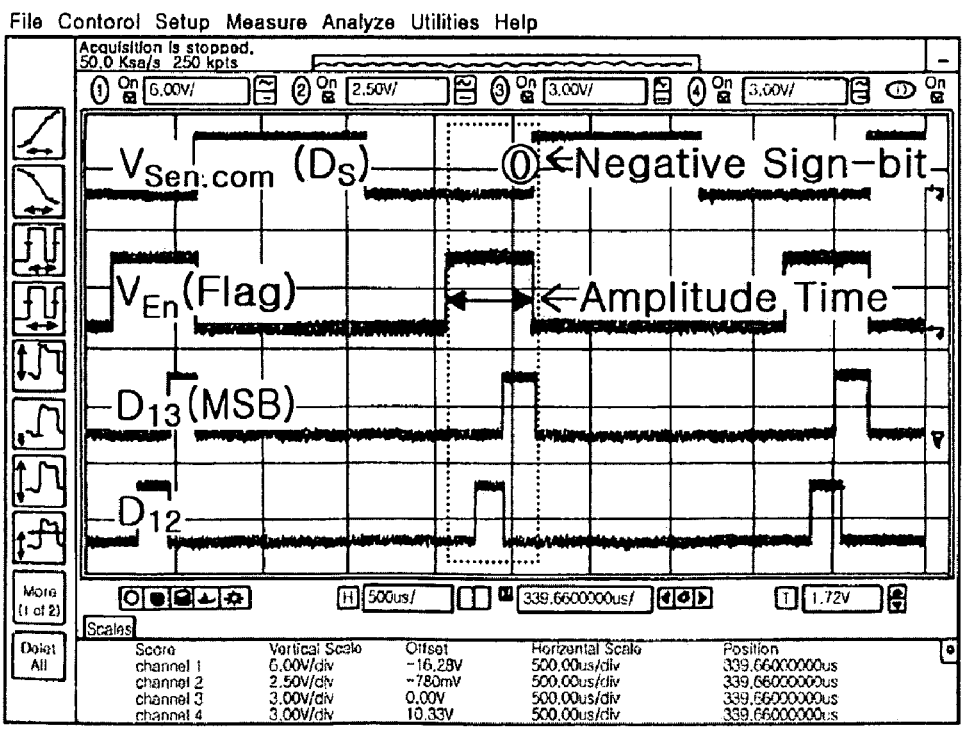

Accordingly, in FIG. 5A and FIG. 5B, the amplitudes of the oscillations are identical to each other but the directions thereof are opposite to each other.

While the present invention has been shown and described in connection with the exemplary embodiments, it will be apparent to those skilled in the art that modifications and variations can be made without departing from the spirit and scope of the invention as defined by the appended claims.

What is claimed is:

1. A bidirectional readout circuit for detecting direction and amplitude of oscillations of a capacitive microelectromechanical system (MEMS) accelerometer, the bidirectional readout circuit comprising:
 a capacitance-to-time conversion unit generating an enable signal having a time change amount corresponding to a capacitance change amount of a capacitive MEMS accelerometer;
 an oscillation detection unit detecting direction and amplitude of an oscillation by using the enable signal; and
 an output unit outputting the detected direction and amplitude of the oscillation as digital values.

2. The bidirectional readout circuit of claim 1, wherein the capacitive MEMS accelerometer uses one of a single input type and a differential input type.

3. The bidirectional readout circuit of claim 1, wherein the capacitance-to-time conversion unit comprises:
 a first capacitance comparator comparing a first voltage corresponding to a first capacitance varying with an external oscillation with a reference voltage and outputting a first square wave having a time width corresponding to the first capacitance;
 a second capacitance comparator comparing a second voltage corresponding to a second capacitance that is a reference, with the reference voltage and outputting a second square wave having a time width corresponding to the second capacitance; and
 an XOR operator performing XOR on the first and second square waves and outputting an enable signal having a time change amount corresponding to a time difference between points in time when the first and second square waves starts, respectively.

4. The bidirectional readout circuit of claim 3, wherein the oscillation detection unit comprises:
 an oscillation direction detector comparing the enable signal with one of the first square wave and the second square wave and detecting the direction of the oscillation; and
 an oscillation amplitude detector detecting the amplitude of the oscillation by a value of counting for an amount of time corresponding to the enable signal.

5. The bidirectional readout circuit of claim 4, wherein the oscillation direction detector comprises a one-bit latch receiving one of the first square wave and the second square wave, and the enable signal and storing the one of the first square wave and the second square wave for a time corresponding to the enable signal.

6. The bidirectional readout circuit of claim 5, wherein the oscillation direction detector detects the direction as "1" when the first square wave outputted from the first capacitance comparator is high, identical to the enable signal, and detects the direction as "0" when the first square wave is low, different from the enable signal.

7. The bidirectional readout circuit of claim 6, wherein the oscillation amplitude detector comprises:
 an n-bit counter counting the second square wave outputted from the second capacitance comparator for a time corresponding to the enable signal; and
 an n-bit latch storing a value of the counted n bits.

8. The bidirectional readout circuit of claim 7, wherein the output unit outputs the direction stored in the one-bit latch as a most significant bit, receives the value of the n bits, stored in the n-bit latch, and outputs the received value as an n+1-bit digital value.

* * * * *